May 27, 1941.  C. A. KLEIN ET AL  2,243,347
TOW BAR FOR AUTOMOBILES
Filed June 14, 1939  2 Sheets-Sheet 1
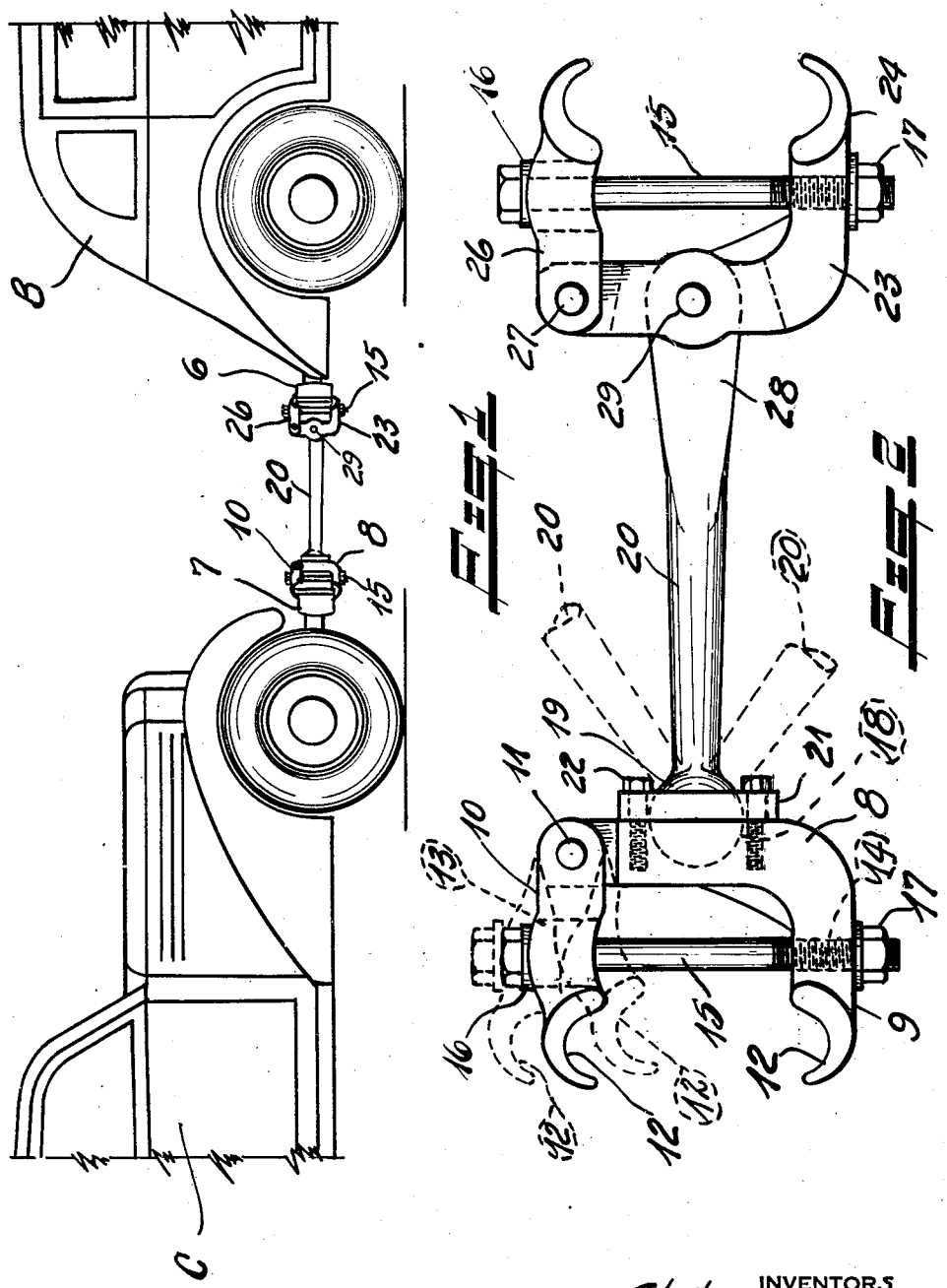
INVENTORS.
Cletus A. Klein,
Boyd H. Russell.
By Frank C. Freeman
ATTORNEY May 27, 1941.　　C. A. KLEIN ET AL　　2,243,347
TOW BAR FOR AUTOMOBILES
Filed June 14, 1939　　2 Sheets-Sheet 2
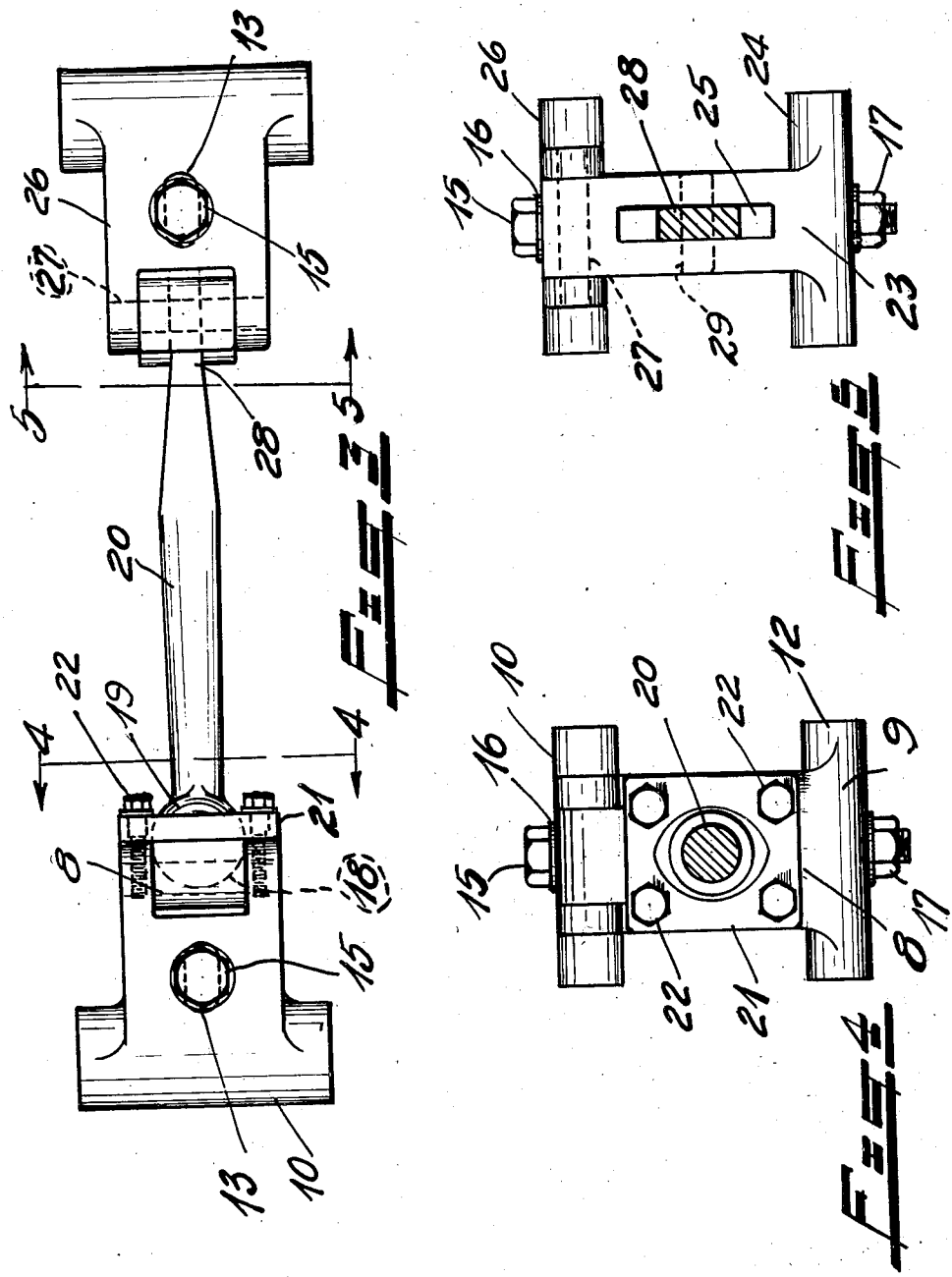

Patented May 27, 1941

2,243,347

UNITED STATES PATENT OFFICE 2,243,347

TOW BAR FOR AUTOMOBILES

Cletus A. Klein and Boyd H. Russell, Caro, Mich.

Application June 14, 1939, Serial No. 279,025

1 Claim. (Cl. 280—33.14)

This invention relates to tow bars for coupling or locking motor vehicles together by engagement with the bumpers thereof.

One of the prime objects of the invention is to provide a simple, practical, and inexpensive tow bar, attachable to the bumpers of the vehicle, so that one vehicle may be coupled to another vehicle for towing at any reasonable speed and eliminate the necessity of providing a driver for said towed vehicle.

Another object is to provide a tow bar structure by means of which the towed vehicle is held in direct alignment with the towing vehicle, and which is so organized and constructed that it compensates for variation caused by unevenness of roadways, turning movement of the towing vehicle, or contact of the vehicle wheels with raised obstacles or other irregularities.

Other objects and advantages will appear and be brought out more fully in the following explanation and by reference to the accompanying drawings in which like reference numerals indicate like parts throughout the several views thereof.

In the drawings:

Fig. 1 is a side elevational view illustrating the application of the invention for towing purposes.

Fig. 2 is an enlarged side elevational view of the tow bar, the broken lines illustrating the swiveling action of the draw bar and the adjustability of the clamp jaw.

Fig. 3 is a top plan view of the assembly shown in Fig. 2.

Fig. 4 is a transverse sectional view taken on the line 4—4 of Fig. 3.

Fig. 5 is also a transverse sectional view taken on the line 5—5 of Fig. 3.

Referring now to the drawings, the letters "B" and "C" indicate a towing vehicle and a towed vehicle respectively, the towing vehicle being equipped with a rear bumper 6, and the towed vehicle having a similar front bumper 7 as usual.

The present invention contemplates the connection of these bumpers 6 and 7 by means of a tow bar which includes a clamp member 8 having a lower jaw 9 formed integral therewith, an upper jaw 10 is pivotally attached to the clamp by means of the pin 11, and a recess 12 is provided in each jaw directly adjacent the free end thereof to accommodate the edges of the bumper members.

A vertically disposed slotted opening 13 is provided in the upper jaw as shown, and a threaded opening 14 is provided in the lower jaw, said opening being adapted to receive the threaded end of the adjusting bolt 15, so that the jaws may be tightly clamped on the bumper, a disc shaped washer 16 being provided beneath the head of the bolt in the conventional manner, and a lock nut 17 is provided on the end of the bolt to prevent accidental disengagement or loosening of the clamp.

The front wall of the clamp member 8 is formed as clearly shown in Fig. 3 of the drawings, a ball seat 18 being provided therein, and accommodates a ball member 19, which is formed integral with the draw bar 20, a cover plate 21 fitting over said ball, and studs 22 serve to secure the plate in position. This construction provides a universal movement sufficient to compensate for any angular relationship of one vehicle with respect to the other.

A substantially similar clamp 23 forms the front end of the structure, the lower end forming a jaw 24, and a slotted opening 25 is provided in the vertical portion of said clamp and for a purpose to be presently described. The upper jaw 26 is pivotally secured to the clamp 23 by means of the pin 27, the jaws are shaped the same as the jaws at the opposite end and engage a bumper in exactly the same manner. No further explanation is deemed necessary as the application is made in exactly the same manner.

The front end of the tow bar is flatted as at 28. This flatted end extending into the slotted opening 25, and a pin 29 forms a pivotal connection as shown, the end of the bar being slightly enlarged to provide maximum bearing surface, while the side walls of the slot are also of increased width so that a large bearing surface is secured.

In practise the jaws 9 and 10 are placed over the bumper and the bolt 15 is manipulated to tightly clamp the jaws thereto. The front end is then attached in exactly the same manner and the vehicle is then ready for towing. No driver is required in the rear, or towed vehicle, and any tortional twist caused by one of the rear wheels of the towing car dropping into a rut, while the opposite front wheel of the towed car passes over a raised obstacle, will be taken care of by the universal connection of the draw bar to the rear clamp and the pivotal connection of the front end of the draw bar to the front clamp; in fact, the universal connection and the pivotal attachment provides for ample range of movement and angular adjustment.

It will be noted that in the descriptive matter, we have referred to the device as having a rear end, but it will be understood that the device may be changed end for end, and will operate in exactly the same manner.

From the foregoing description, it will be clearly obvious that we have perfected a very simple, sturdy, and practical coupling by means of which the towed car is held in direct alignment with towing car, so that one car may be towed any distance and at any reasonable speed, over any roadway on which a driven car may travel, and without a driver in the rear or towed vehicle.

What we claim is:

A device of the kind described, comprising a pair of clamps, each having opposed jaws, a single tow bar connecting said clamps the rear end being provided with a ball for universal connection to the rear clamp, the front end having pivotal connection with the front clamp for pivotal movement in a vertical direction only, the ends of the bar being connected at a point intermediate of the jaws, for effecting draft strain from the bar centrally of said clamps in a horizontal direction and at angularity of the latter, each clamp including a substantially L-shaped double arm member and an adjustably pivoted member carried by one arm thereof, the other arm of said L-shaped member being formed with a clearance intermediate with respect to the jaws of the clamp for receiving the end adjacent thereto of the bar, and means connecting the bar and clamps together at the interfitting points thereof.

CLETUS A. KLEIN.
BOYD H. RUSSELL.